United States Patent
Breese

(10) Patent No.: US 6,634,078 B1
(45) Date of Patent: Oct. 21, 2003

(54) METHOD OF MANUFACTURING A SPLINED MEMBER FOR USE IN A SLIP JOINT

(75) Inventor: Douglas E. Breese, Northwood, OH (US)

(73) Assignee: Torque-Traction Technologies, Inc., Holland, OH (US)

(*) Notice: Subject to any disclaimer, the term of this patent is extended or adjusted under 35 U.S.C. 154(b) by 0 days.

(21) Appl. No.: 09/301,431

(22) Filed: Apr. 28, 1999

(51) Int. Cl.$^7$ .............. F16C 3/03; F16D 3/06
(52) U.S. Cl. .......... 29/527.2; 29/527.1; 72/88; 464/162
(58) Field of Search ............ 29/527.1, 527.2, 29/893.32; 72/88; 464/162

(56) References Cited

U.S. PATENT DOCUMENTS

| | | |
|---|---|---|
| 1,253,108 A | 1/1918 | Taylor |
| 3,084,572 A * | 4/1963 | Starck |
| 3,115,052 A * | 12/1963 | McCardell |
| RE27,068 E | 2/1971 | Groves et al. |
| 3,857,273 A * | 12/1974 | Miller et al. |
| 3,982,415 A * | 9/1976 | Killop |
| 4,380,918 A * | 4/1983 | Killop |
| 4,552,544 A | 11/1985 | Beckman et al. |
| 4,712,408 A | 12/1987 | Killop |
| 5,042,153 A | 8/1991 | Imao et al. |
| 5,243,874 A | 9/1993 | Wolfe et al. |
| 5,720,102 A | 2/1998 | McClanahan |
| 5,730,018 A * | 3/1998 | Kobayashi et al. |
| 6,105,413 A * | 8/2000 | Duggan et al. |

FOREIGN PATENT DOCUMENTS

| | | | |
|---|---|---|---|
| EP | 0 047 107 | * | 3/1982 |
| EP | 1084775 | * | 3/2001 |
| JP | 06 074229 | * | 3/1994 |

* cited by examiner

Primary Examiner—Gregory Vidovich
Assistant Examiner—Eric Compton
(74) Attorney, Agent, or Firm—MacMillan, Sobanski & Todd, LLC

(57) ABSTRACT

A method for manufacturing a splined member, such as a male or female splined shaft, having a low friction coating applied thereto includes the initial step of providing a length of cylindrical stock having a predetermined outer diameter. The end of the cylindrical stock is then machined by any conventional process to form a preform including an end portion and a neck portion. Next, the end portion of the preform is subjected to a cold working process by a conventional roll forming machine or similar tool to form a plurality of splines about the circumference thereof. The cold working process is effective to re-shape the end portion of the preform to form the splines without the removal of any material therefrom. As a result, each of the splines is formed having a generally involute cross sectional shape, wherein opposed sides of the splines are relatively gently curved between the inner roots and the outer ends thereof. The splines define a major diameter that is somewhat larger than the initial outer diameter of the preform and a minor diameter that is somewhat smaller than the initial outer diameter of the preform. Thereafter, the splines and the neck portion of the preform are coated with a conventional low friction material to form the splined tube shaft. A broaching machine or similar apparatus is used to precisely shape the solidified low friction material about the splines.

14 Claims, 4 Drawing Sheets

US 6,634,078 B1

METHOD OF MANUFACTURING A SPLINED MEMBER FOR USE IN A SLIP JOINT

BACKGROUND OF THE INVENTION

This invention relates in general to the manufacture of slip joints, such as are commonly used in vehicle drive train systems, for transmitting rotational force or torque between telescoping members, while accommodating relative axial movement therebetween. In particular, this invention relates to an improved method for manufacturing a splined member, such as a male or female splined shaft, having a low friction coating applied thereto for use in such a slip joint.

In most land vehicles in use today, a drive train system is provided for transmitting rotational power from an engine/transmission assembly to an axle assembly so as to rotatably drive one or more wheels of the vehicle. A typical drive train system includes a driveshaft assembly that is connected between an output shaft of the engine/transmission assembly and an input shaft of the axle assembly. To accomplish this, a first universal joint is connected between the output shaft of the engine/transmission assembly and a first end of the driveshaft assembly, and a second universal joint is connected between a second end of the driveshaft assembly and the input shaft of the axle assembly. The universal joints provide a rotational driving connection from the output shaft of the engine/transmission assembly through the driveshaft assembly to the input shaft of the axle assembly, while accommodating a limited amount of angular misalignment between the rotational axes thereof.

Not only must the drive train assembly accommodate a limited amount of angular misalignment between the engine/transmission assembly and the axle assembly, but it must also typically accommodate a limited amount of relative axial movement. A small amount of such relative axial movement frequently occurs when the vehicle is operated. To address this, it is known to provide one or more slip joints in the driveshaft assembly of the drive train system. A typical slip joint includes male and female telescoping members having respective pluralities of splines formed thereon. The male splined member has a plurality of outwardly extending splines formed on the outer surface thereof yhat cooperate with a plurality of inwardly extending splines formed on the inner surface of the female splined member. The cooperating splines of the male and female members provide a rotational driving connection through the slip joint, while permitting a limited amount of relative axial movement therebetween. The slip joint may be provided at the ends of the driveshaft assembly or in the interior thereof.

In the past, the splined members have been formed by a machining process, wherein material was removed from the member to form the splines. To accomplish this, the member was initially formed having a surface of predetermined size and shape. Then, a cutting tool (typically a hobbing tool) was moved into engagement with the surface of the member to form the splines by removing material therefrom. The remaining material on the member formed the plurality of splines. As a result of this machining process, the splines were formed having relatively square faces, i.e., faces that were generally flat and extended generally radially relative to the rotational axis of the member. Then, the splined member was coated with a material having a relatively low coefficient of friction. The low friction coating was provided to minimize the amount of force required to effect relative movement between the two splined members. Also, the low friction coating provided a relatively tight fit between the cooperating splines of the two splined members, thus minimizing any undesirable looseness therebetween while continuing to allow free axial movement.

Although the above-described machining process for forming the splines has functioned satisfactorily for many years, it has been found to be somewhat inefficient. This is because the machining process has been found to be relatively slow and expensive to perform. Also, the machining process results in a quantity of scrap material that must be disposed of, which further complicates the manufacturing process. Thus, it would be desirable to provide an improved method for manufacturing a splined member, such as a male or female splined shaft, having a low friction coating applied thereto for use in a slip joint.

SUMMARY OF THE INVENTION

This invention relates to an improved method for manufacturing a splined member, such as a male or female splined shaft, having a low friction coating applied thereto for use in a slip joint. Initially, a length of cylindrical stock is provided having a predetermined outer diameter. The end of the cylindrical stock is then machined by any conventional process to form a preform including an end portion and a neck portion. Next, the end portion of the preform is subjected to a cold working process by a conventional roll forming machine or similar tool to form a plurality of splines about the circumference thereof. The cold working process is effective to re-shape the end portion of the preform to form the splines without the removal of any material therefrom. As a result, each of the splines is formed having a generally involute cross sectional shape, wherein opposed sides of the splines are relatively gently curved between the inner roots and the outer ends thereof. The splines define a major diameter that is somewhat larger than the initial outer diameter of the preform and a minor diameter that is somewhat smaller than the initial outer diameter of the preform. Thereafter, the splines and the neck portion of the preform are coated with a conventional low friction material to form the splined tube shaft. A broaching machine or similar apparatus is used to precisely shape the solidified low friction material about the splines.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
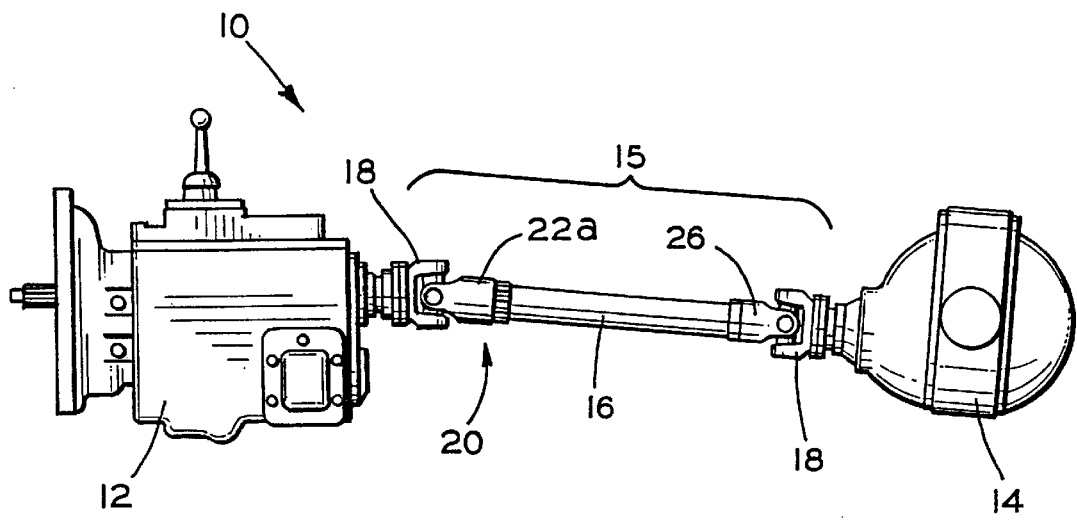
FIG. 1 is a side elevational view schematically illustrating a vehicle drive train system including a slip joint manufactured in accordance with the method of this invention.

Referring now to the drawings, there is illustrated in FIG. 1 a vehicle drive train system, indicated generally at 10, in accordance with this invention. The illustrated drive train system 10, which is intended to be representative of any drive train system, vehicular or otherwise, includes a transmission 12 having an output shaft (not shown) that is connected to an input shaft (not shown) of an axle assembly 14 by a driveshaft assembly 15. The transmission 12 and the axle assembly 14 are conventional in the art. The driveshaft assembly 15 includes a hollow cylindrical driveshaft tube 16 extending from a front end adjacent to the transmission 12 to a rear end adjacent to the axle assembly 14. The driveshaft assembly 15 further includes a pair of universal joints 18 for rotatably connecting the transmission output shaft to the front end of the driveshaft assembly 15 and for rotatably connecting the rear end of the driveshaft assembly 15 to the axle input shaft. The universal joints 18 are also conventional in the art.

A slip joint, indicated generally at 20, is provided for connecting the front end of the driveshaft tube 16 to the front universal joint 18. The structure of the slip joint 20 is illustrated in detail in FIG. 2. As shown therein, the slip joint 20 includes a slip yoke, indicated generally at 22, including a hollow cylindrical body portion 22a having a plurality of splines 22b formed on an inner circumferential surface thereof. The slip yoke 22 has a pair of spaced apart arms (not shown in FIG. 2) extending from the body portion 22a that are connected to the front universal joint 18. The slip joint 20 also includes a tube shaft, indicated generally at 24, including a cylindrical body portion 24a having a plurality of splines 24b formed on an outer circumferential surface thereof. The body portion 24a of the tube shaft 24 is secured to the forward end of the driveshaft tube 16 in a conventional manner, such as by welding. The splined end of the tube shaft 24 is sized to fit telescopically within the splined end of the slip yoke 22 such that the respective splines cooperate in a known manner to form the slip joint 20. The telescoping nature of the slip joint assembly 20 facilitates the installation of the driveshaft assembly 15 within a vehicle, accommodates relative axial movement between the transmission 12 and the axle assembly 14 (such as might be caused by movement of the vehicle over rough terrain), and provides for some absorption of energy in a collision of the vehicle.

A tube yoke 26 is provided for connecting the rear end of the driveshaft tube 16 to the rear universal joint 18. The tube yoke 26 is conventional in the art and secured to the rearward end of the driveshaft tube 16 in a conventional manner, such as by welding. It will be appreciated that the slip joint 20 may alternatively be provided for connecting the rear end of the driveshaft tube 16 to the rear universal joint 18, and that the tube yoke 26 may be provided for connecting the front end of the driveshaft tube 16 to the front universal joint 18. Alternatively, it will be appreciated that the slip joint 20 may be provided in the interior portion of the driveshaft tube 16, such as is commonly found in three joint driveshaft assemblies wherein the driveshaft tube 16 is split into two driveshaft tube sections. Similarly, a number of other splined components are commonly used in conventional driveshaft assemblies, and the scope of this invention is intended to cover such other splined components.

Figure 2:
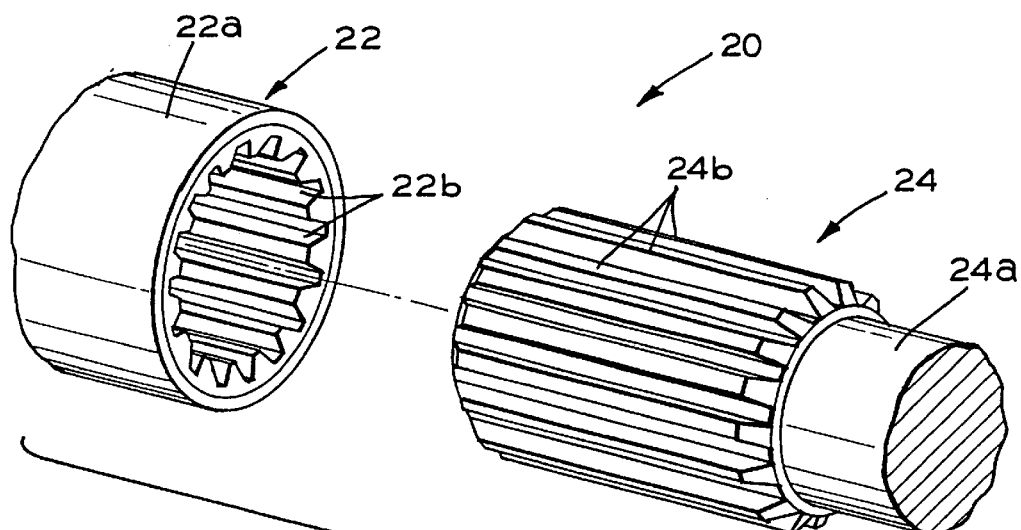
FIG. 2 is an enlarged perspective view of the slip joint of the vehicle drive train system illustrated in FIG. 1.
Figure 3:
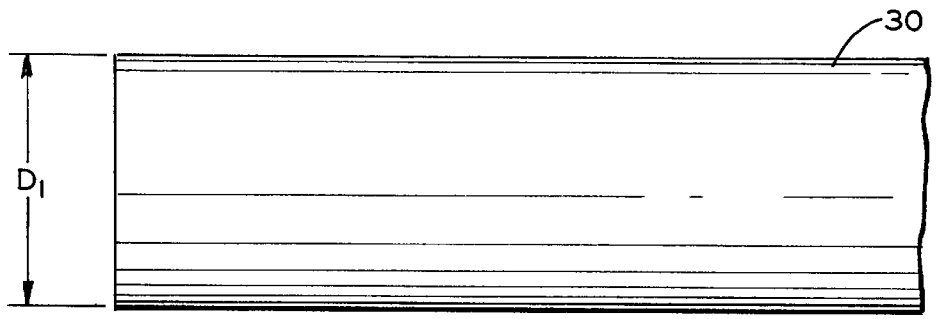
FIGS. 3, 4, and 5 are elevational views showing the steps in a prior art method for manufacturing the tube shaft illustrated in FIG. 2.
Figure 4:
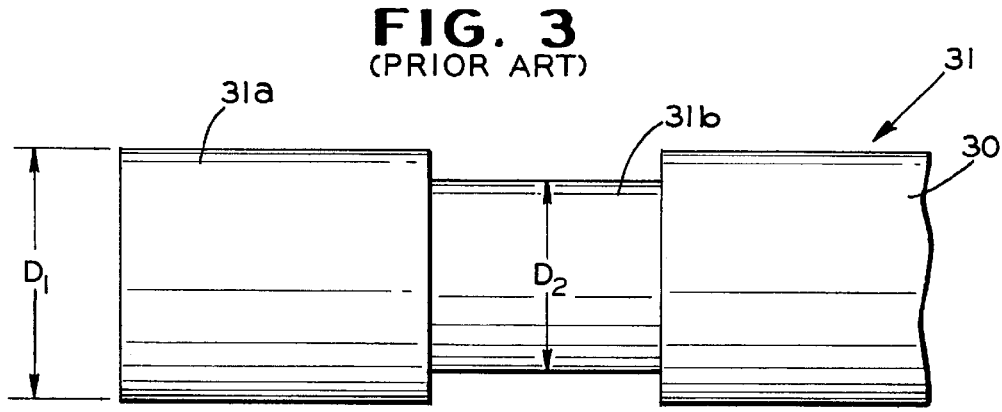

Referring now to FIGS. 3 through 6, there is illustrated a prior art method for forming the splined tube shaft 24 illustrated in FIG. 2. Initially, a length of cylindrical stock 30 is provided, as shown in FIG. 3, having a predetermined outer diameter $D_1$. The end of the cylindrical stock 30 is then machined by any conventional process to form a preform, indicated generally at 31 in FIG. 4. The machined preform 31 includes an end portion 31a having an outer diameter that is preferably about the same as (or only slightly smaller than) the outer diameter $D_1$ of the cylindrical stock 30. The machined preform 31 further includes a neck portion 31b extending from the end portion 31a. The neck portion 31b is formed having an outer diameter $D_2$ that is somewhat smaller than the outer diameter $D_1$ of the end portion 31a. The purpose for the reduced diameter neck portion 31b will be explained below.

Figure 5:
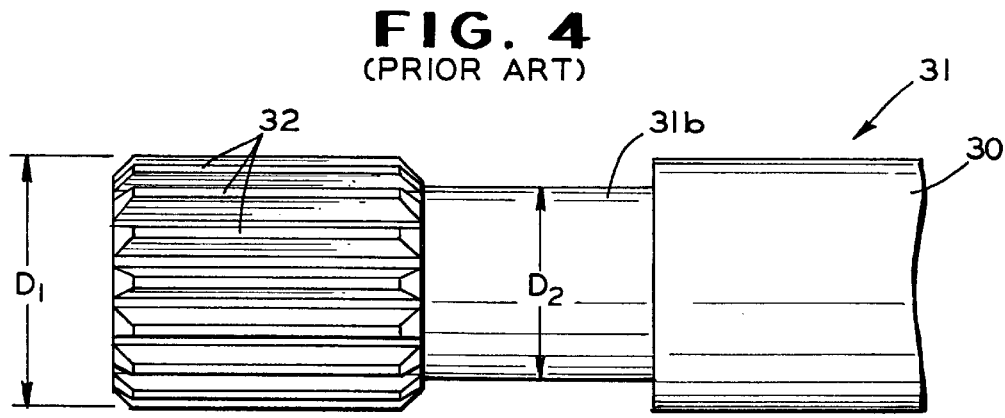
Figure 6:
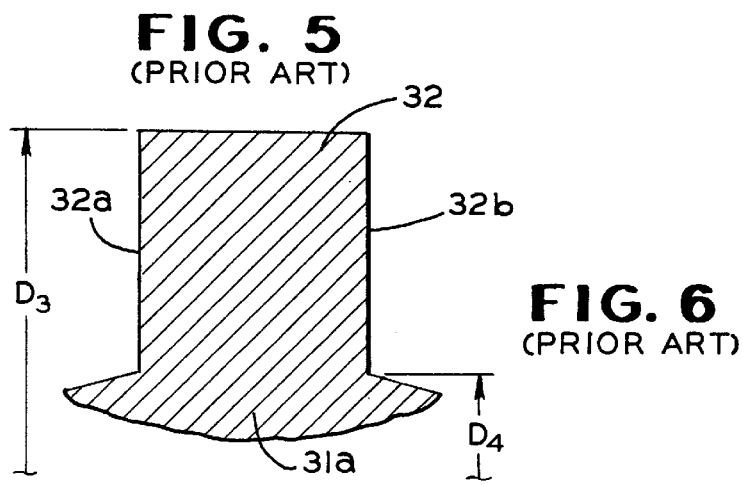
FIG. 6 is an enlarged sectional elevational view of a portion of the preform illustrated in FIG. 5.

Next, as shown in FIG. 5, the end portion 31a of the preform 31 is subjected to a further machining process to form a plurality of splines 32 about the circumference thereof. This machining process can be accomplished by a conventional broaching or hobbing tool (not shown) that is moved axially relative to the preform 31. As a result of this machining process, each of the splines 32 is formed having a generally rectilinear cross sectional shape, such as shown in FIG. 6, wherein opposed sides 32a and 32b of the splines 32 are generally flat and extend generally radially (or slightly inclined) relative to the rotational axis of the preform 32. The splines 32 define a major diameter $D_3$ and a minor diameter $D_4$.

Preferably, the major diameter $D_3$ of the splines is approximately equal to the outer diameter $D_1$ of the end portion 31a of the preform 31. However, if desired, the major diameter $D_3$ of the splines 32 may be slightly smaller than the outer diameter $D_1$ of the end portion 31a of the preform 31. This can be accomplished by machining the outer surfaces of the splines 32 to precisely define the major diameter $D_3$. In either event, the minor diameter $D_4$ of the splines 32 is somewhat larger than the outer diameter $D_2$ of the neck portion 31b of the preform 31. The neck portion 31b is formed having this reduced diameter $D_2$ so as to provide adequate clearance for the broaching or hobbing tool used to form the splines 32.

Thereafter, the splines 32 and the neck portion 31b of the preform 31 are coated with a conventional low friction material (not shown) to form the splined tube shaft 24. This coating process typically occurs in two steps. First, the splines 32 and the neck portion 31b of the preform 31 are coated with the low friction material. Although this low friction material can be applied in any desired manner, it has been found desirable to provide a quantity of the low friction material in particulate form, heat the preform to a predetermined temperature, and to dip the heated preform 31 into the quantity of the low friction material. The heated preform 31 melts the low friction material, which then adheres to the preform 31. The preform 31 is then removed and cooled, allowing the low friction material to solidify thereon. Second, a broaching machine or similar apparatus is used to precisely shape the coating of the solidified low friction material on the preform 31.

Figure 7:
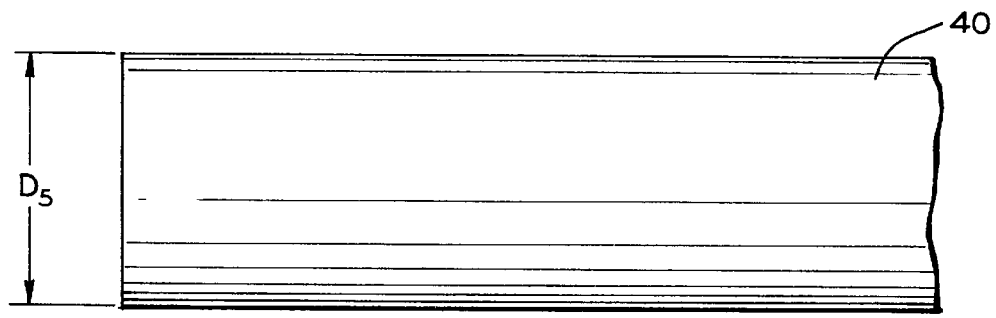
FIGS. 7, 8, and 9 are elevational views showing the steps in the method of this invention for manufacturing the tube shaft illustrated in FIG. 2.
Figure 8:
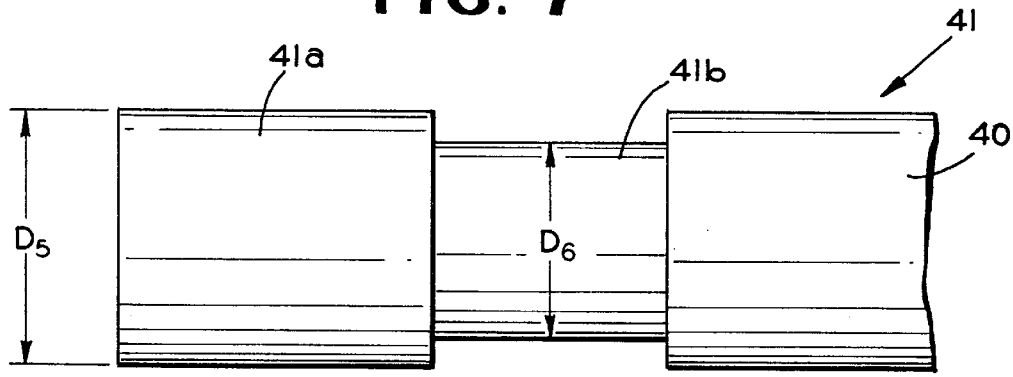

Referring now to FIGS. 7 through 10, there is illustrated an improved method for forming the splined tube shaft 24 illustrated in FIG. 2 in accordance with this invention. Initially, a length of cylindrical stock 40 is provided, as shown in FIG. 7, having a predetermined outer diameter $D_5$. The end of the cylindrical stock 40 is then machined by any conventional process to form a preform, indicated generally at 41 in FIG. 8. The machined preform 41 includes an end portion 41a having an outer diameter that is preferably about the same as (or only slightly smaller than) the outer diameter $D_5$ of the cylindrical stock 40. The machined preform 41 further includes a neck portion 41b extending from the end portion 41a. The neck portion 41b is formed having an outer diameter $D_6$ that is somewhat smaller than the outer diameter $D_5$ of the end portion 41a. The purpose for the reduced diameter neck portion 41b will be explained below.

Figure 9:
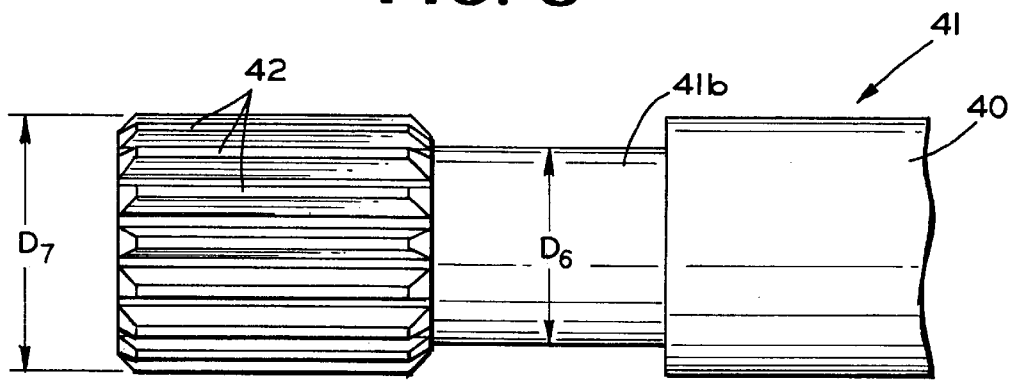

Next, as shown in FIG. 9, the end portion 41a of the preform 41 is subjected to a cold working process to form a plurality of splines 42 about the circumference thereof. This cold working process is preferably performed by a conventional roll forming machine or similar tool (not shown), a wide variety of which are known in the art. However, any other cold working process or apparatus is contemplated to be within the scope of this invention. The cold working process is effective to re-shape the end portion 41a of the preform 41 to form the splines 42 without the removal of any material therefrom. To accomplish this, the roll forming tool is moved into engagement with portions of the outer surface of the end portion 41a of the preform 41. The material located at each portion of such engagement flows circumferentially outwardly into the adjacent areas of the end portion 41a to form the splines 42. Thus, the portions of the outer surface of the end portion 41a of the preform 41 that are engaged by the roll forming tool become the roots between adjacent ones of the splines 42.

Figure 10:
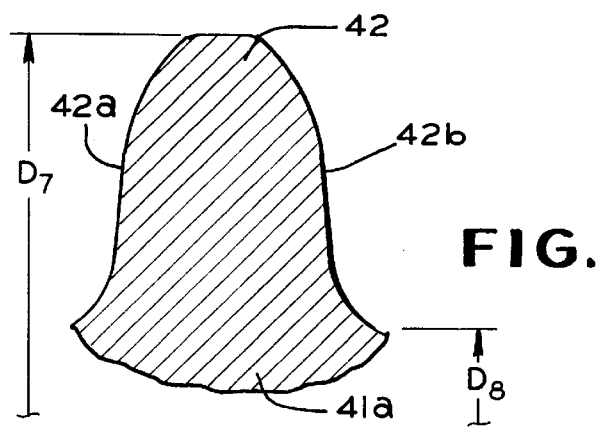
FIG. 10 is an enlarged sectional elevational view of a portion of the preform illustrated in FIG. 9.

Consequently, at the conclusion of this cold working process, the overall volume of the material of the end portion 41a of the preform 41 has not significantly changed. Rather, the material of the end portion 41a has merely been re-shaped by the cold working process to move material from between the splines 42 into the splines 42 themselves. The splines 42 formed by this cold working process define a major diameter $D_7$ and a minor diameter $D_8$, as shown in FIG. 10. The major diameter $D_7$ defined by the splines 42 is somewhat larger than the outer diameter $D_5$ of the preform 41 prior to the cold working process. Similarly, the minor diameter $D_8$ of the splines 42 is somewhat smaller than the outer diameter $D_5$ of the preform 41 prior to the cold working process. Also, as a result of this cold working process, each of the splines 42 is formed having a generally involute cross sectional shape, such as shown in FIG. 10, wherein opposed sides 42a and 42b of the splines 42 are relatively gently curved between the inner roots and the outer ends of the splines 42. The cold working process is preferably performed in such a manner that the minor diameter $D_8$ of the splines is approximately equal to (or only slightly greater than) the outer diameter $D_6$ of the neck portion 41b of the preform 41, for a purpose that will be explained below. Thereafter, the splines 42 and the neck portion 41b of the preform 41 are coated with a conventional low friction material in the same manner as described above.

Figure 11:
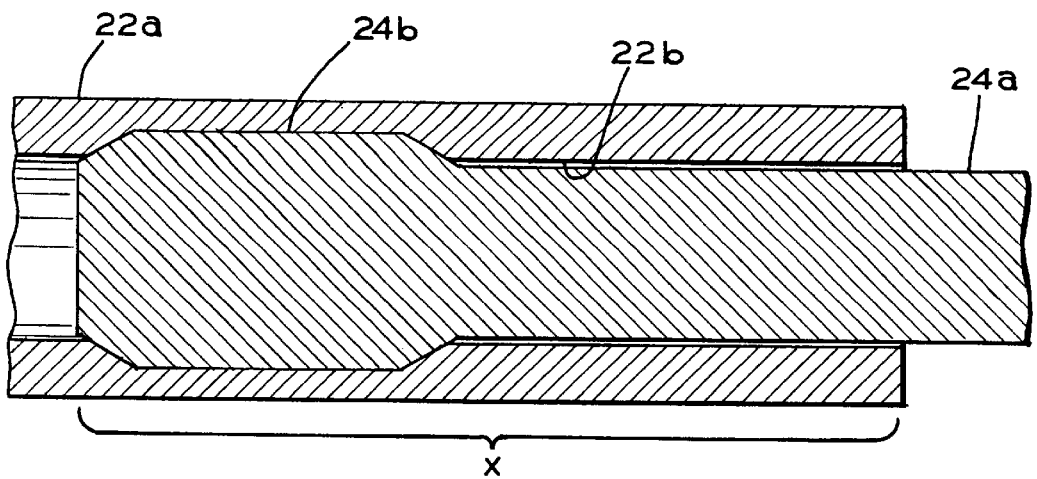
FIG. 11 is a sectional elevational view showing the slip joint illustrated in FIG. 2 in the assembled condition after the tube shaft has been manufactured in accordance with the method of this invention.

FIG. 11 shows the slip joint 20 illustrated in FIG. 2 in the assembled condition after the tube shaft 24 has been manufactured in accordance with the method of this invention. As shown therein, the internal splines 22b formed on the slip yoke 22 cooperate with the external splines 24b formed on the tube shaft 24 in the normal manner to provide a rotational driving connection between the slip yoke 22 and the tube shaft 24. The cylindrical body portion 24a of the tube shaft 24 is formed by the neck portion 41b of the preform 41 after it has been coated with the low friction material. As mentioned above, the minor diameter $D_8$ of the splines is approximately equal to (or only slightly greater than) the outer diameter $D_6$ of the neck portion 41b of the preform 41. The internal splines 22b of the slip yoke 22 also extend adjacent to the outer surface of the cylindrical body portion 24a of the tube shaft 24, with only a very small radial clearance therebetween. This small radial clearance minimizes the amount of axial misalignment between the slip yoke 22 and the tube shaft 24 throughout the entire axial length designated as X in FIG. 11.

Figure 12:
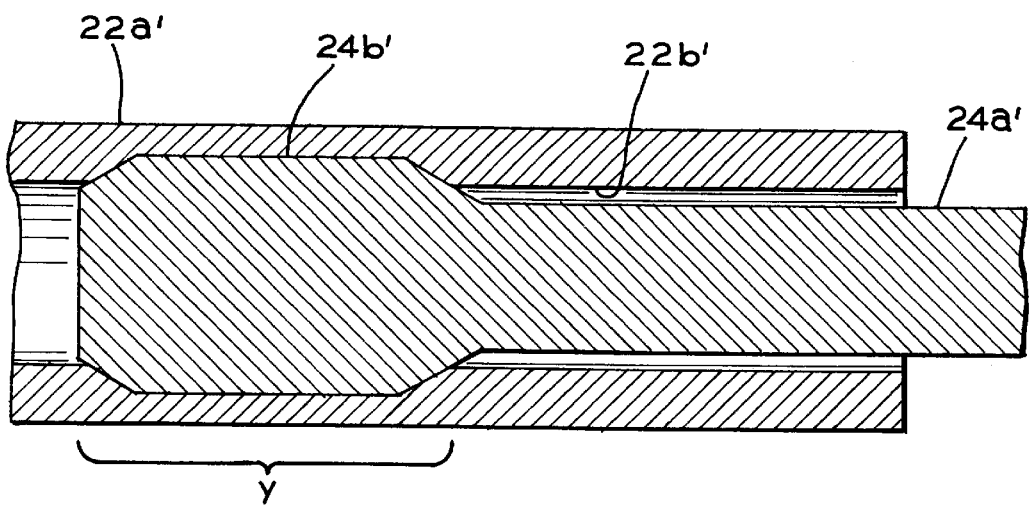
FIG. 12 is a sectional elevational view similar to FIG. 11 showing the slip joint illustrated in FIG. 2 in the assembled condition after the tube shaft has been manufactured in accordance with the prior art method illustrated in FIGS. 3 through 6.

This structure can be contrasted to the prior art slip yoke structure illustrated in FIG. 12, wherein similar reference numbers are used to designate similar structures. As shown therein, the internal splines 22b' formed on the slip yoke 22' cooperate with the external splines 24b' formed on the tube shaft 24' in the normal manner to provide a rotational driving connection between the slip yoke 22' arid the tube shaft 24'. The cylindrical body portion 24a' of the tube shaft 24' is formed by the neck portion 31b of the preform 31 after it has been coated with the low friction material. As mentioned above, the minor diameter $D_4$ of the splines is somewhat larger than the outer diameter $D_2$ of the neck portion 31b of the preform 31. As a result, the internal splines 22b' of the slip yoke 22' do not extend adjacent to the outer surface of the cylindrical body portion 24a' of the tube shaft 24'. This large radial clearance does not prevent axial misalignment between the slip yoke 22' and the tube shaft 24'. Only within the region of the cooperating splines 22b' and 24b' (indicated by the relatively short axial length designated as Y in FIG. 12) is this misalignment prevented.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of manufacturing a male splined member for use in a slip joint comprising the steps of:
   (a) providing a length of cylindrical stock that defines an outer diameter;
   (b) forming a neck portion in the cylindrical stock adjacent to an end portion thereof, the neck portion defining a neck portion diameter that is less than the outer diameter of the cylindrical stock, the end portion defining an end portion diameter that is substantially the same as the outer diameter of the cylindrical stock; and
   (c) deforming the end portion of the cylindrical stock to form a plurality of splines therein, the plurality of splines defining a major diameter that is greater than the end portion diameter and a minor diameter that is approximately equal to the neck portion diameter.

2. The method defined in claim 1 wherein said step (a) is performed by providing a length of solid cylindrical stock.

3. The method defined in claim 1 wherein said step (b) is performed by machining a portion of the cylindrical stock to form the neck portion.

4. The method defined in claim 1 wherein said step (c) is performed by roll forming the end portion to form the plurality of splines.

5. The method defined in claim 1 wherein said step (c) is performed such that each of the splines has an involute cross sectional shape.

6. The method defined in claim 1 wherein said step (c) is performed without the removal of material from the end portion.

7. The method defined in claim 1 including the further step of coating the plurality of splines and the neck portion with a low friction material.

8. A method of manufacturing a slip joint comprising the steps of:
  (a) providing a male splined member by (1) providing a length of cylindrical stock that defines an outer diameter; (2) forming a neck portion in the cylindrical stock adjacent to an end portion thereof, the neck portion defining a neck portion diameter that is less than the outer diameter of the cylindrical stock, the end portion defining an end portion diameter that is substantially the same as the outer diameter of the cylindrical stock; and (3) deforming the end portion of the cylindrical stock to form a plurality of splines therein, the plurality of splines defining a major diameter that is greater than the end portion diameter and a minor diameter that is approximately equal to the neck portion diameter;
  (b) providing a female splined member having a plurality of splines; and
  (c) inserting the male splined member within the female splined member such that (1) the plurality of splines on the female splined member cooperate with the plurality of splines formed on the male splined member to provide a rotational driving connection therebetween while allowing relative axial movement and (2) the plurality of splines on the female splined member cooperate with the neck portion of the male splined member to minimize axial misalignment therebetween.

9. The method defined in claim 8 wherein said step (a)(1) is performed by providing a length of solid cylindrical stock.

10. The method defined in claim 8 wherein said step (a)(2) is performed by machining a portion of the cylindrical stock to form the neck portion.

11. The method defined in claim 8 wherein said step (a)(3) is performed by roll forming the end portion to form the plurality of splines.

12. The method defined in claim 8 wherein said step (a)(3) is performed such that each of the splines has an involute cross sectional shape.

13. The method defined in claim 8 wherein said step (a)(3) is performed without the removal of material from the end portion.

14. The method defined in claim 8 including the further step of coating the plurality of splines and the neck portion with a low friction material.

* * * * *